Jan. 27, 1959 C. CHEDISTER 2,870,548

DRIVER TRAINING AND TESTING EQUIPMENT

Filed Oct. 12, 1953 4 Sheets-Sheet 1

INVENTOR.
CONKLING CHEDISTER
BY
Morgan, Finnegan & Durham
ATTORNEYS.

DRIVER TRAINING AND TESTING EQUIPMENT

Filed Oct. 12, 1953

4 Sheets-Sheet 2

INVENTOR.
CONKLING CHEDISTER
BY
Morgan, Finnegan & Durham
ATTORNEYS.

INVENTOR
CONKLING CHEDISTER
BY Morgan, Finnegan, Durham & Pine,
ATTORNEYS

INVENTOR.
CONKLING CHEDISTER
BY
Morgan, Finnegan & Durham
ATTORNEYS.

United States Patent Office 2,870,548

Patented Jan. 27, 1959

2,870,548

DRIVER TRAINING AND TESTING EQUIPMENT

Conkling Chedister, Livingston, N. J.

Application October 12, 1953, Serial No. 385,401

31 Claims. (Cl. 35—11)

The present invention relates to educational devices and more particularly to apparatus for the group instruction of individuals in the operation of a plurality of controls, such as the controls of an automobile, and preferably for recording the manner in which such controls are so operated.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figures 1, 2:
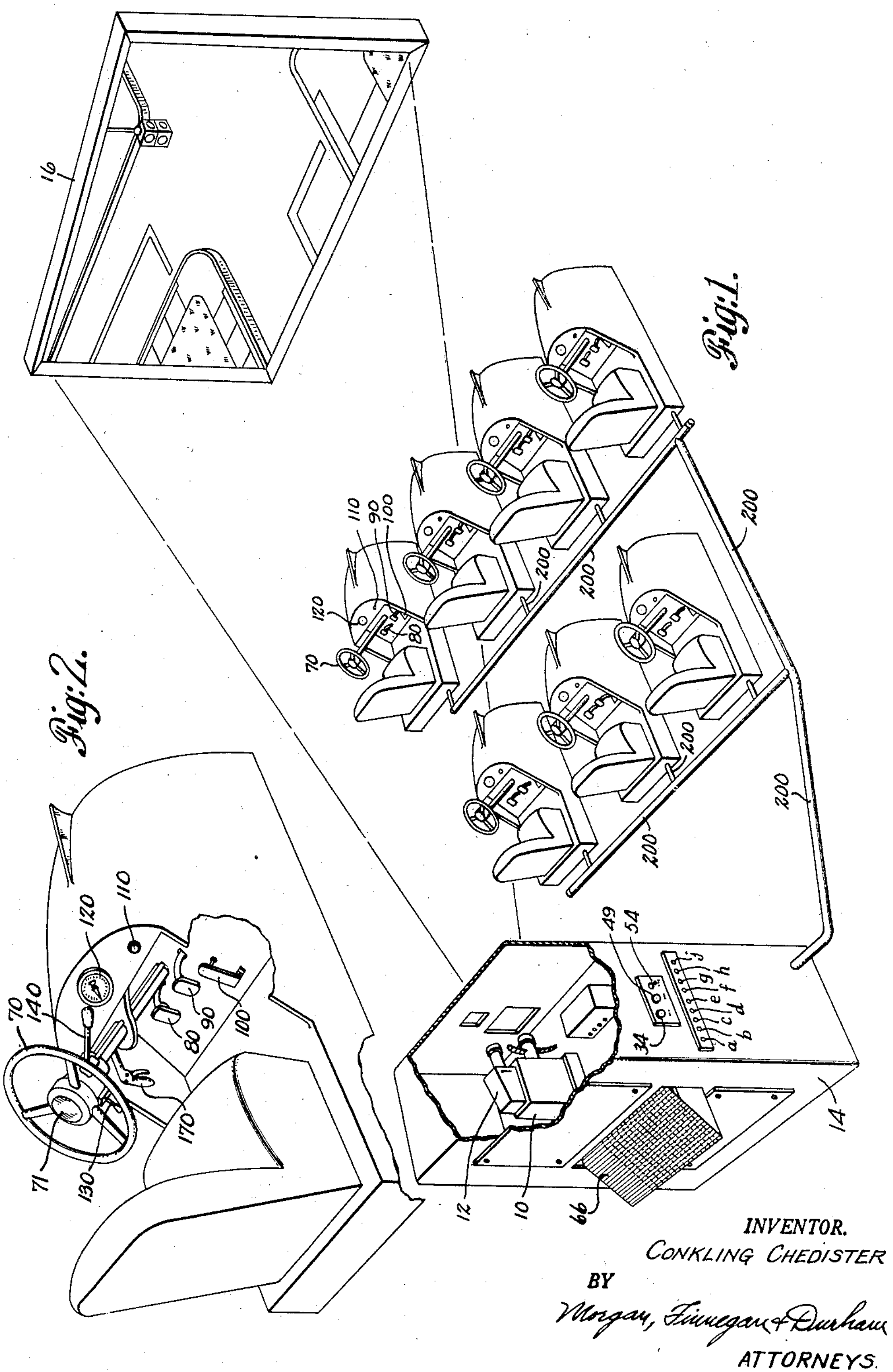
Figure 1 is a schematic perspective view of a typical and illustrative embodiment of the present invention especially adapted for the simultaneous instruction of a group in the driving of an automotive vehicle, such as an automobile.
Figure 2 is a detailed perspective view of one of the control positions used in Figure 1.

Heretofore, apparatus for the teaching or testing of complex manipulative operations which must become almost automatic psychomotor responses properly timed and selected in response to a variety of stimuli, have been adapted for use with only a single person where a record was desired to show what response was made. Where a group was to be simultaneously subjected to a single series of stimuli, no means has been provided for measuring or recording any of the responses of any one or more of the individuals being taught or tested, and especially with a group of two or more individuals being subjected to a rapid series of stimuli or to stimuli which call for nicely coordinated or timed responses, it is impossible for the instructor or supervisor to make any accurate or permanent observation of the results of the various individuals.

The present invention has for its object the provision of a novel and improved group training or testing apparatus by which the timed or coordinated responses of a group of individuals to a series of stimuli may be individually measured and recorded, especially when the responses require the operation of one or more controls selected from a group of such controls. A further object is the provision of a training and testing apparatus for use by a group being trained or tested in the operation of an automobile, all of the group being simultaneously subjected to a series of stimuli as preferably presented by a motion picture, while the timed and coordinated individual responses are measured and recorded by a central control apparatus on a record sheet. The invention further provides an apparatus in which the series of stimuli may be automatically presented by a motion picture film with the measuring parts automatically conditioned by the film or selectively actuated in an arbitrary manner by an instructor. The invention further provides improved means for measuring and for recording certain of the functioning of the apparatus as it is actuated by the individuals of the group.

In general, the apparatus of the present invention comprises a central recording and control unit and a plurality of individual control positions or units, interconnected so that selective operation of the controls of the individual control units in response to stimuli presented in series from the central control unit, the individual controls being selectively conditioned for effective operation from the central control unit, causes a corresponding record to be made, preferably at the central control unit, showing the manner in which the appropriate control at each individual unit was operated and preferably whether or not it was operated correctly or in accordance with a predetermined standard.

The central control unit preferably includes a stimulus generator, such as a motion picture projector to project a moving picture on a screen in front of the individuals to be tested, and the film projected includes a predetermined series of stimuli such as the various traffic hazards and incidents which might be encountered in travel on a highway, or may be verbal instructions demanding the use of control members in a particular manner, and at a particular time. Thus, in a projected sequence showing automobile travel along a street, a traffic light may change from green to red requiring a stop, or from red to green requiring the starting of the vehicle; the road may curve requiring steering; in starting clutch, accelerator and gear shifting operations are required; in shifting proper sequence of clutch, accelerator and gear shift lever are required; in stopping, the brake should not be applied too hard; in turning, the directional signal should be used; some occasions may require use of the horn; and on completing the sequence, the ignition switch should be locked and the brake set. A short or prolonged and varied sequence of such operations and others in a natural manner may well be presented by a motion picture whose scenes impliedly require certain of these operations or the actions may be called for by verbal (oral or visually projected) directions.

At the central control unit are conditioning switches which may be manually or automatically operated to condition various electrical circuits so that other switches may be operated effectively by the individuals being tested. Where the switches are to be automatically operated, they are preferably conditioned from the film and in coordinate relation to the portions of the film then being projected, and preferably by means of a switch actuated from the film itself, as by notches in the edge thereof, this switch causing a stepped advance of a stepping switch which in turn controls selected ones of a series of relays at the central control unit which are operatively connected to other switches at the several individual control units or positions.

The central control unit also preferably includes a second projector by which slides or strip film images may be selectively projected on the screen, in such order and time relation as may be arbitrarily determined by the instructor or automatically as determined by controls operated from the stepping switch.

The central control unit is preferably positioned at one side of a classroom, and the projection screen at the opposite side thereof, with the several students or individuals to be tested at their respective control positions therebetween and oriented to face the screen, the several control positions being electrically connected with the central control unit and with the recording unit.

Each of the individual control positions preferably comprises a definite location for each of the persons to be trained or tested, and a group of control members to be actuated by the person in response to the stimuli observed or received by him. Where automibile driving is being taught or tested, each of the control positions may comprise a driver's seat, a steering wheel, a brake pedal, an accelerator, a parking brake lever, a horn switch, a clutch pedal and a gear shift lever. Other less essential parts may be included such as an "ignition" switch speedometer, directional signal switch, starter switch, and the like, depending on what equipment is usually provided in an ordinary vehicle and is desired to be taught or tested as to its operation by the subjects.

Such individual control positions or units may be used in a group of any desired number, but as many as 20 to 30 such units may be conveniently used with a single screen on which the series of stimuli are presented from the projector of the central control unit, in a room of conventional size such as 20′ by 30′, allowing ample spacing of the units and the screen from all of the units.

Also preferably included in each of the individual control units are switches or other signal producing devices to be actuated on operation of each of the control members. The steering wheel is preferably provided with switches responsive to whether it is turned to the right or left or is allowed to remain in a straight-ahead position. The brake pedal operates on a switch on being depressed, and a second switch to be operated if the brake pedal is depressed fully or violently. The accelerator pedal controls the speed of a small motor, which is loaded to closely follow the action of the accelerator pedal, and the clutch pedal simulates control of the load applied to the motor, while speed responsive switches controlled by the motor and the clutch pedal respond to the coordinated operation of the accelerator and clutch pedal, while the speedometer is driven according to the operation of the motor.

Preferably, the motor means creates sound as it runs, so there is an audible means provided for determining the speed of the motor under control of the accelerator, clutch and brake as with a conventional motor vehicle.

The steering wheel is preferably biased to return to a normal or straight ahead position, and is loaded so that the further it is turned the greater is the resistance to its turning.

The clutch pedal, when used, is provided with means for changing the feel of the pedal depending on the rate at which it is moved from disengaged position to an initial engaging position, and from the initial engaging position to fully engaged position; and with switches actuated on full engagement, full disengagement and the rate of movement at the time of the initial engagement movement.

The directional signal control preferably comprises switches selectively actuated by movement of the signal control to the right or to the left.

The brake pedal is preferably adapted to control a plurality of switches depending on the position of the brake pedal corresponding to positions of normal or emergency (full) application and to released position.

A parking brake is also provided with switches selectively actuated in accordance with whether it is set or released.

A gear shift lever is adapted to control switches selectively distinguishing between the several positions of the lever, such as reverse, neutral, low, second and high ratio positions.

Some or all of the switches are connected through conductors and relays to actuate measuring and/or recording parts, which are conveniently and illustratively positioned at and form part of the central control unit.

Such measuring and recording parts are preferably those required to produce a record of the response of each individual to the several stimuli presented and the concomitant conditioning of the various circuits.

The measuring and recording mechanism provides means for feeding a record member or sheet, and means for recording thereon the individual responses of the several subjects to the series of stimuli, preferably on different portions of the record sheet so that the response of each subject to each stimulus can be identified.

As embodied, the second sheet comprises a relatively large sheet divided into a number of columns each of which corresponds to a particular subject, while along the column are provided spaces for the record of the subject's responses to each of the several stimuli of the series. Thus the record sheet, when completed, may be scanned in one direction to learn what was done by all of the individuals in response to a particular stimulus, and in the other direction to learn how an individual subject responds to the entire series.

The feed mechanism is preferably operated once each stimulus, and conveniently one or more indicia are recorded on the record which may be coded so that a group of indicia show which of the controls were operated, the manner in which they were operated or whether or not the appropriate control was operated within a given period. For example, one, two, three or all of four indicia may be recorded, each showing a particular operation, or a combination of them showing correct or incorrect operation of a particular control or a set of controls at a particular time.

The measuring and recording apparatus is exemplarily adapted to print four indicia at each stimulus response, and the four indicia form a record of four different factors which are involved in the correct response to a particular stimulus, while on the next stimulus the same four indicia may indicate the correctness of the response with other control members or combinations thereof to the entirely different factors involved.

In the central control unit are preferably provided a plurality of conditioning switches for manual operation, which may be used to condition the various circuits so that particular responses may be called for and recorded in arbitrary sequence and without operation of the projector. In this manner of operation, the oral directions of the instructor form the stimuli to which the student is expected to respond.

It will be understood that the foregoing general description and the following detailed description as well are exemplary and explanatory of the invention but are not restrictive thereof.

Referring now in detail to the present preferred and illustrative embodiment of the invention as shown in the accompanying drawings, the apparatus is conveniently divided into a plurality of units such as the combined central projection and control units, a projection screen on which the projected images are shown for viewing, and a plurality of individual control units at each of which is seated a subject to operate its several control members and the actuation of these members causes indicia to be recorded on a record sheet at the central control unit.

Figure 3:
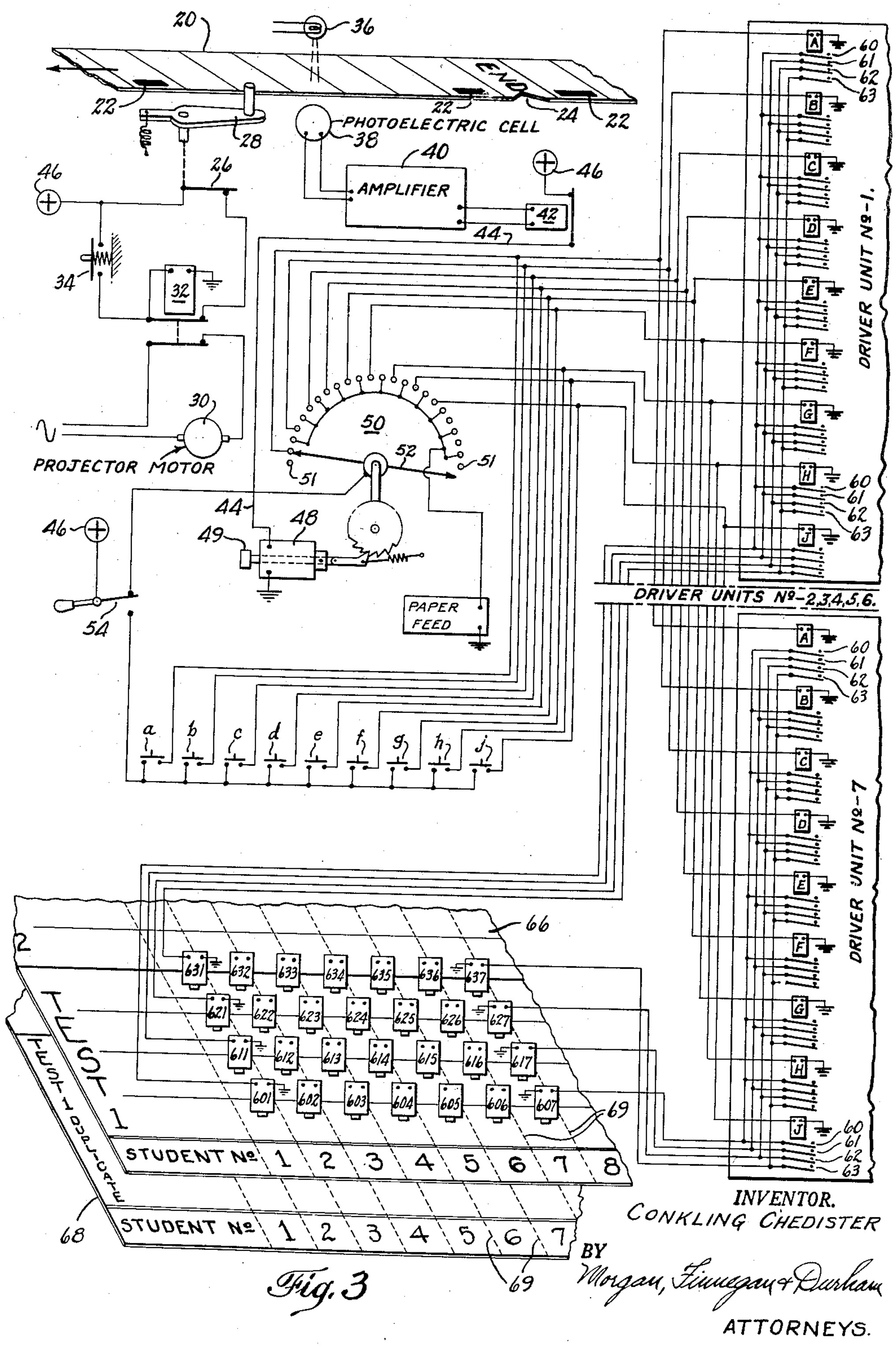
Figure 3 is a schematic wiring diagram of the central control unit used in the present embodiment of the invention, as shown in Figure 1.

As illustratively shown in Figures 1 and 3, the projection unit comprises a motion picture projector 10 and a changeable slide projector 12, suitably mounted in a casing 14 and both adapted to project images on a screen 16 which may be some 15 feet from the projector and often as far as 50 feet or more. The projectors 10 and 12 and the screen 16 are preferably arranged adjacent to opposite sides of a room which is otherwise dimly lighted.

The motion picture projector 10 is preferably a continuous projector so that the film may be repeatedly projected without rewinding. Such a film preferably includes a sequence of incidents which follow each other in a logical order such as putting an automobile in motion on a highway followed by turning corners, traffic lights, pedestrians, stopping, etc. or in a more elementary series of starting the motor, releasing the parking brake, depressing the clutch, shifting into gear and eventually into high with the coordinated actuation of the accelerator, and eventually stopping. Using the control members provided and relating these to normal driving conditions a wide variety of incidents may be used and combined in different orders, to prevent the majority of traffic incidents on the screen.

The projector 10 is preferably a motion picture film projector and passage of the film through the projector preferably causes actuation of various control circuits conditioning various selected control members to be actuated by each of the subjects viewing the projected picture, different portions of the film causing conditioning of different selected controls or combinations of controls, preferably related to the motion picture projected by the projector.

Other control circuit conditioning means are preferably provided for arbitrary manual operation by the instructor so that incidents may be repeated ad infinitum or presented in irregular, changing or any desired sequence.

A slide film projector, with slide change means is also preferably provided so that stationary scenes or indicia may be projected on the screen in timed relation with the conditioning of the control circuits and under control of the motion picture film or for use with the arbitrary circuit selection by the instructor.

Projector 10 is driven by means of an electric motor 30 supplied with power from the mains through a holding relay 32 which may be moved to closed position by means of push button 34 (normally open) and held in energized position by switch 26 (normally closed) by arm 28 engaging the edge of the film. When push button 34 is closed, the motor 30 starts moving the film and is held closed until arm 28 next engages a notch 24 in the film edge, whereupon the motor 30 is stopped.

On one side of the film 20 is provided an exciter lamp 36, the light from which is passed through the edge of the film 20 to excite the photocell 38, except when the light is interrupted by passage of one of the opaque spots 22. Photocell 38 has its output amplified by an amplifier 40 and controls relay 42 so that line 44 is connected to a source of power 46 except when the light is interrupted by a spot 22, thereby causing momentary interruptions of the power supplied to solenoid 48 of the rotary stepping switch 50, which is thereby advanced one step at a time, in the present embodiment providing a repeated sequence of 24 contacts or steps, the first and last of the contacts 51 being simultaneously interconnected by the rotary switch member 52 which is supplied with power from the source 46 by means of manual switch 54, in one position of this double throw switch. The amplifier may be energized by the same power source used for the projector motor and if desired connected in parallel therewith as illustrated in Figure 3. The photocell exciter lamp 36 may be energized by a separate energizing circuit (not shown) within the amplifier by connection of its terminal to suitable terminals on the amplifier.

The several switch contacts 51 may correspond to different conditioning functions for different stimuli, and as many as desired may be left blank or unconnected, and any contact may be connected to condition any selected one of the relays A, B, C, D, E, F, G, H, or J.

While only nine relays A—J are shown, any number may be provided, but as embodied, and for use with a particular sequence of incidents to be presented in a predetermined order by the film 20, the second contact 51 is connected to energize relay A, while the fourth, sixth, eighth, tenth, twelfth, fourteenth, sixteenth and eighteenth are connected individually to energize relays B, C, D, E, F, G, H and J, respectively, all of the relays being normally open and the remaining contacts being connected to actuate the paper feed mechanism for the record sheet so that it is advanced after each recording operation.

A series of manually operated switches is also provided for operating the relays A—J in any desired or arbitrary sequence and at any desired time. For this purpose the series of normally open, manually closed push buttons *a, b, c, d, e, f, g, h* and *j* are individually connected to the relays A—J respectively and are supplied with power through a common line which is connected to a source of power by the manual switch 54 in its other position. In general, and where a part receives power from a source 46, the return circuit is through a ground connection as indicated in the drawings.

Each driver position is provided with its individual set of conditioning relays A—J, which are interconnected for selecting actuation simultaneously and thus when one relay A is energized, all of the relays A are energized, and likewise with the relays B, etc.

Each relay A—J corresponds to a particular control and is so connected that the manner in which the corresponding control is actuated by the subjects being trained or tested may be analyzed and the manner of operation recorded. In the illustrative embodiment, each relay A—J comprises a set of four normally open switch contacts moved to contact closing position on energizing of the relay magnet. One set of the contacts is connected to switches 60, 61, 62 and 63 actuated by the subject controlled control members, while the other set are individually connected to the recording mechanism at the central control unit, preferably through a common conductor. Thus each relay A—J has a set of four movable and four stationary contacts, and relay actuated contacts A60, B60, C60, D60, E60, F60, G60, H60 and J60 are all connected to the same recording means, while the relay contacts A60, etc. of another individual position are connected to a different recording means but in a similar position. Thus, recording means 601 serve for driver unit No. 1, 602 for No. 2, 603 for No. 3 and so on, while recorder 611 serves to record the current impulses transmitted through contact 61 by the subject at driver unit No. 1 and 625 and 637 for contacts 62 of unit No. 5 and contact 63 of unit No. 7, respectively.

Recorders 601, 602, 603, 604, 605, 606, 607, 611, 612, 613, 614, 615, 616, 617, 621, 622, 623, 624, 625, 626, 627 and 631, 632, 633, 634, 635, 636, 637 may all be conveniently duplicates of each other, arranged in four banks of seven each, although these numbers are illustrative only and more or fewer banks each of more or less than seven may be used in the same manner. The several recorders for each individual subject are preferably alined with each other so that they may all print in a single column, one such column being provided for each individual subject.

Each of the recorders 601 to 637 preferably comprises a solenoid having an armature movable by the electromagnetic force into contact with a sheet of paper 66 and normally held retracted from the paper, as by a spring, the end of the armature adjacent the paper being provided with a marking member, such as inked felt or crayon so as to make a spot on the paper sheet 66 as the sheet is supported on a flat surface.

Figure 5:
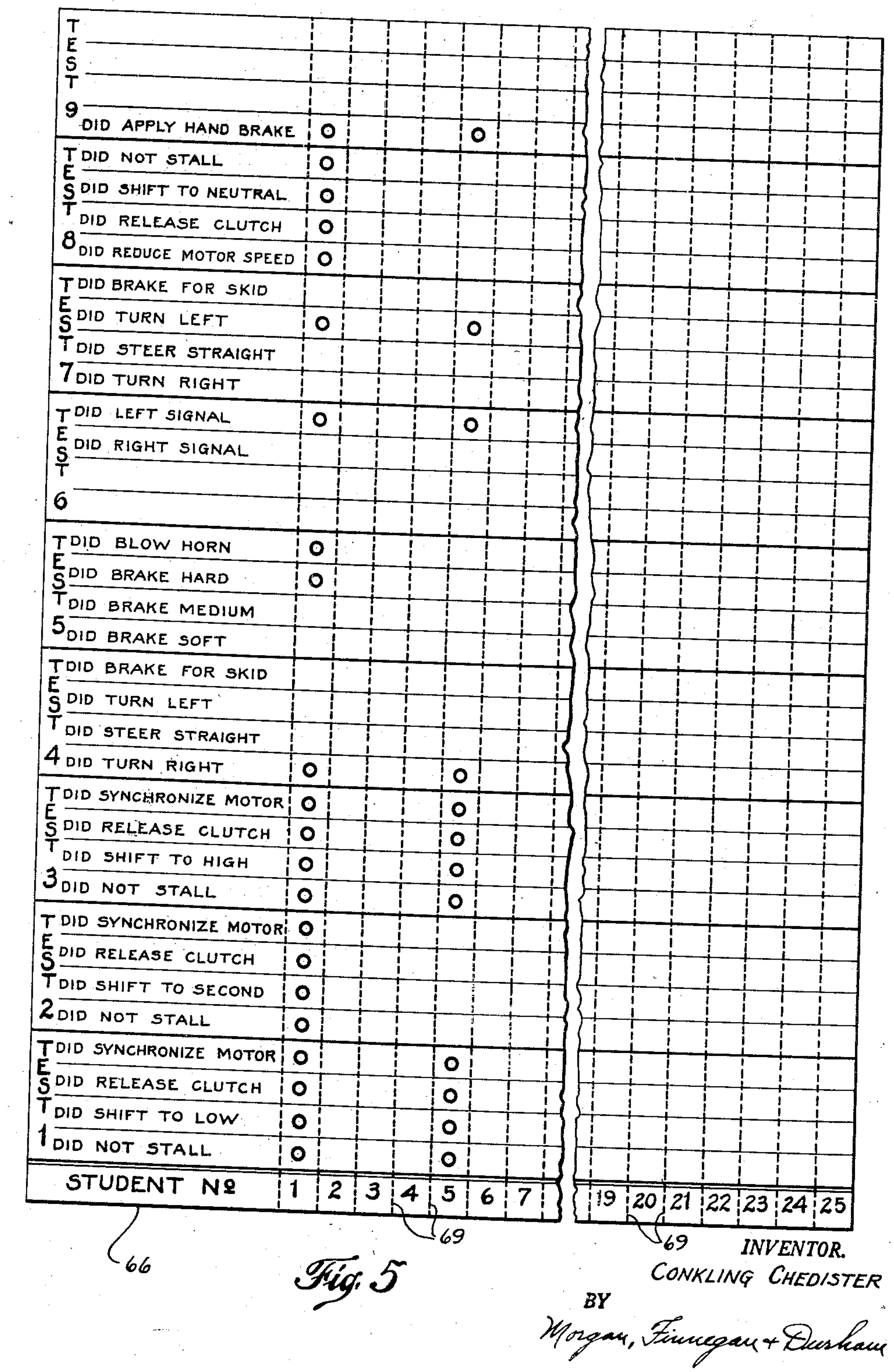
Figure 5 is a fragmentary, plan view of a record sheet adapted for use in the present embodiment and adapted to be used as the record sheet in the central control unit of Figures 1 and 3.

The record sheet comprises a sheet of paper 66 which may conveniently be backed by a second or duplicate sheet 68 in register therewith, sheet 66 being printed with carbon or transfer compound on its undersurface. Each of the sheets 66 and 68 is divided into a number of vertical columns, one for each of the individual control positions 1 to 7 or more and provided with horizontal columns in groups of four for each of the several tests to be performed. Thus conveniently there may be nine tests, with four possible record indicia for each test, or thirty-six horizontal columns, divided into twenty-five columns for each of twenty-five subjects or pupils. At one side margin of the sheets may be printed a key word indicating the significance of a mark opposite that key word. Thus in Figure 5, the mark in the lowest horizontal column means that pupils 1 and 5 did not stall the motor on test No. 1. The vertical columns are preferably separable from each other by means of the perforations 69 on one or both sheets 66 and 68. Thus, the instructor may separate sheet 66 into columns for distribution to the individual members of the class and retain the sheet 68 for his permanent record.

Figure 4:
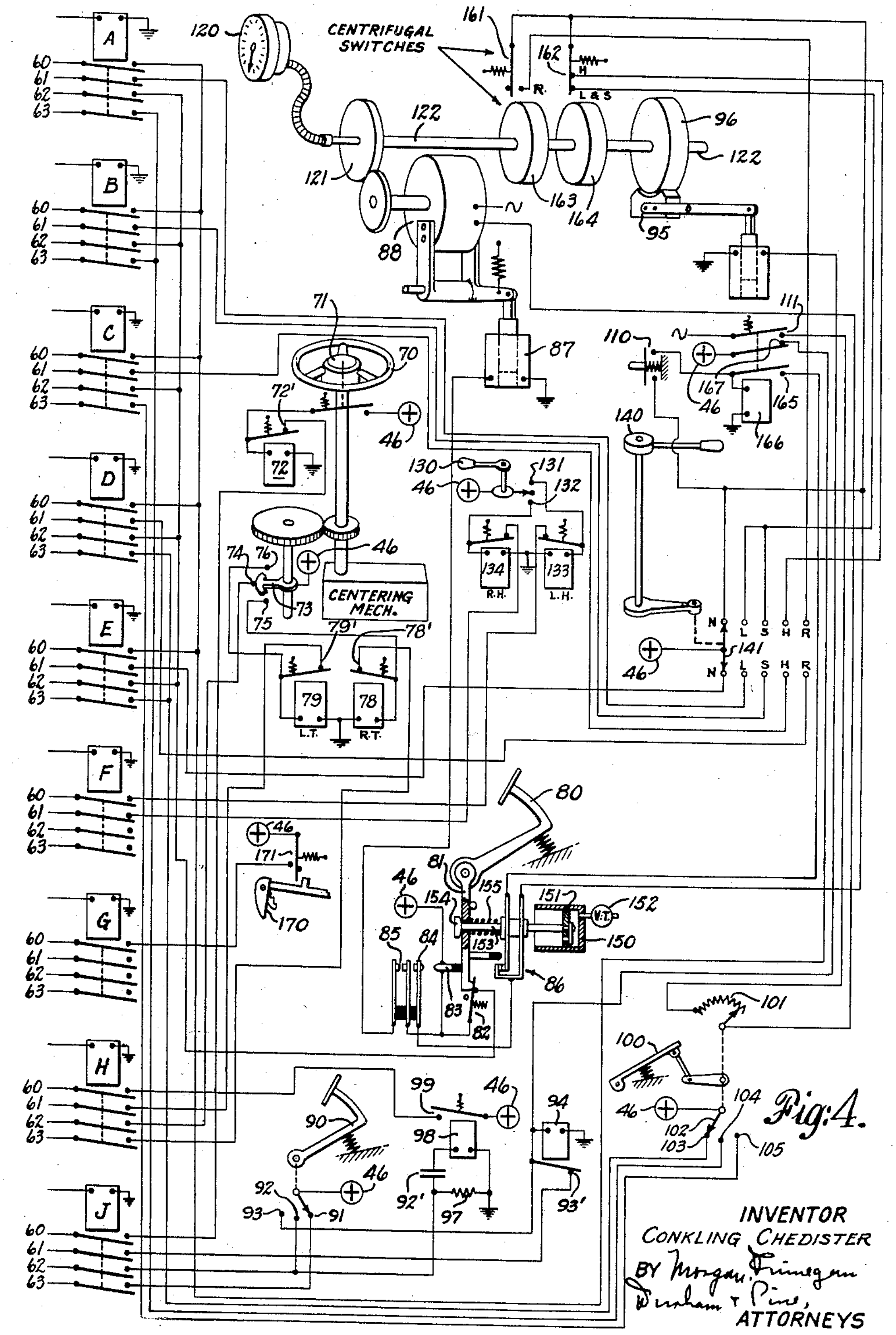
Figure 4 is a schematic wiring diagram of an individual control position used in the present embodiment of the invention, as shown in Figures 1 and 2.

Figure 4 shows diagrammatically the various control members of an individual driver unit or control position such as shown in their normal relation in Figure 2. For training and testing an automobile driver for a conventional automobile, each individual control position would usually include a steering wheel 70, a clutch pedal 80, a brake pedal 90, an accelerator 100, a starting switch 110, a speedometer 120, a directional signal 130, a gear shift lever 140, horn button 71 and a parking brake 170. Other controls may be added or others substituted, and may be connected to be operated in any desired sequence.

The horn button is connected to close a delayed operated relay 72 which functions to open the associated contacts 72' after a short delay to open the circuit from the source 46 to the contact J60. Before opening, it energizes the associated marker magnet on the recorder. Relay 72 is provided as a delayed operating relay to prevent preenergizing before relay J60 has been conditioned for the incident about to be tested, thereby preventing a "correct" indication being produced by premature operation of the horn button 71, such as might otherwise be caused by operation of the horn button 71 prior to conditioning of the relay J60.

Steering wheel 70 is connected by reduction gearing to a movable contact 73 which contacts with a central contact 74 in straight ahead position, or with contact 75 or 76 as the wheel is steered to the right or left respectively, while it is returned to straight ahead position and restrained against movement by centering mechanism.

Contacts 75 and 76 are connected to transmit impulses to relay contact H63, or H61 respectively through delayed operated relays 78 and 79 which function in the same way as relay 72 to energize the associated marker magnet prior to opening of the associated contacts 78' and 79'. As with the horn 71, premature operation of the steering wheel does not produce a record.

Clutch pedal 80 is pivotally mounted and spring returned to clutch engaged position. Depending from the clutch pedal and moved thereby is an arm 81 which on slight movement of pedal 80 closes switch 82, on further movement of the clutch pedal to disengaged position, pushes contact plunger 83 against contact 84 to supply 84 with current from a source 46 and also closes contacts 85. Closure of contact 82 supplies current to relay contacts E62, D62, C62, B62 and A62 as the clutch is disengaged. If desired the contact 82 can be arranged to operate a relay similar to relay 72 which in turn would momentarily energize contacts E62, D62, C62, B62 and A62 rather than continuously energize them as long as the clutch pedal 80 is depressed. Contacts 83 and 84, on being closed, supply current to a switch 86, while contacts 84, 85 supply current from source 46 to a solenoid 87 while the clutch pedal is in disengaged position. Solenoid 87 rocks electric motor 88 into and out of driving engagement with a friction disc 121 on rotatable shaft 122.

Arm 81 is also adapted to actuate the piston 151 of a dash pot 150. The piston 151 of the dash pot is provided with a check valve allowing air to enter the dash pot freely as the piston is withdrawn, while preventing escape of air from the dash pot except through a regulable bleed valve 152. The piston rod 153 of the piston 151 is freely slidable in arm 81 but is moved by the arm by reason of the head 154, while the piston is returned by spring 155. Thus the rate of depressing the clutch pedal is immaterial and the dash pot cylinder 150 is charged with air. However, on moving the clutch pedal for engagement, spring 155 is compressed and the compression of the air in the dash pot can be felt by the subject in the "feel" of the clutch, while excessively rapid engagement of the clutch ahead of the bleed of air by valve 152 causes spring 155 to be compresed excessively and thereby allows contacts 86 to be opened. If this opening of contacts 86 occurs before the clutch pedal 80 has been moved to fully engaged position, current is supplied from source 46 through contacts 83 and 84 to contacts 86 and through one of them to contacts 161 and 162 of centrifugal switches 163, 164, while the other contact serves to supply to the contact 165 of holding relay 166 which is normally held closed after being initially closed by momentary closure of the starting switch 110, connected to the other contact of switch 86. Thus too rapid engagement of the clutch breaks the holding circuit of relay 166 and deenergizes the relay, requiring restarting of the cycle by pressing switch 110. Holding relay 166 supplies current through contact 165, maintains closed the contacts 167 to complete a circuit from source 46 through contact 167 to contacts A60, B60, C60, D60 and E60 so as to cause an actuation of recorders 601, 602, 603 etc. only if that circuit is energized at that time through stepping switch 50, thereby indicating that the operator did not stall.

Brake pedal 90 is pivotally mounted and spring returned to brake disengaged position. Brake pedal carries a movable contact adapted to supply power from a source 46 to a "brake disengaged" contact 91, a "service braking" contact 92 or an "emergency stop" contact 93 corresponding to full braking effort. Contact 91 is connected to relay contact J63, and contact 92 to relay contacts J62. Contact 93 is connected to energize a delayed action relay 94 to open contact 93' thereby interrupting the supply of current to relay contact J61 and also energizing solenoid actuated brake 95 to eventually stop flywheel 96 and shaft 122 on which it is mounted to be driven by motor 88. Each time brake pedal 90 is depressed to close contact 92, condenser 92' is charged and when the rate of charging exceeds the current leak through high resistance 97, relay 98 is energized to close contact 99, thereby supplying current to relay contact H60, corresponding to a feathering action of the brake pedal, or repeated light applications, such as is desirable in driving on slippery ice.

The accelerator pedal 100 is normally spring returned to idling position. Pedal 100 actuates a variable resistance 101 so that the further it is depressed the more resistance is cut out of the circuit by which alternating current is supplied to motor 88, while holding relay 165 is engaged, and motor 88 is preferably connected to drive audible means simulating the sound of an automobile engine. Pedal 100 also moves a movable contact 102 adapted to engage contact 103, 104 or 105 in idle, slightly open or open throttle position of the pedal 100. Contact 103 is connected to relay contacts D60 and E60, contact 104 to relay contacts A63 and B63 and contact 105 to relay contact C63. Thus, the accelerator must be returned to idle position when the gear shift lever is to be in neutral or reverse, must be in a normally open position in second speed or low gear driving and must be more fully opened in high gear, when the position of the accelerator is to be checked through selection of the proper contacts on the stepping switch 50.

Starter switch 110 is conveniently mounted on the dash panel of each individual control unit and is adapted to cause actuation of the gang relay 166. Switch 110 supplies power to the coil of relay 166 from a source 46 when the clutch pedal is repressed to engage contacts 83 and 84, thereby supplying current through contact 86 to the switch 110. When coil 166 has been energized contact 165 is closed thereby holding the circuit closed until the operator mistakenly engages the clutch too fast or the film cycle is completed. Relay 166 also includes a contact 111 through which alternating current is supplied to motor 88 under control of the accelerator controlled resistor 101.

Speedometer 120 simulates a conventional speedometer and is calibrated with the audible effects produced by the motor 88, as well as with the speed of travel depicted by the film 20 as it is projected. Thus, an indicated speed of 25 M. P. H. on the speedometer 120, would be the proper motor speed for road travel of 25 M. P. H. as depicted by the motion picture speed, and such a motor speed would be produced by positioning the accelerator so that contact 105 was closed, and resistor 101 produces a speed in motor 88 of about 1400 R. P. M. Speedometer 120 is driven by shaft 122 from motor 88 and under control of brake 95.

Directional signal switch 130 comprises a single pole double throw switch mounted on the steering column and provided with a left turn contact 131 and a right turn contact 132. Closure of contact 131 supplies current to delayed operated relay 133, and contact 132 to delayed operated relay 134. Each relay 133 and 134 energizes the associated marker magnet before opening. The delay operating relays 133 and 134 avoid the possibility of a record being made by premature operation of the directional signal control.

Shift lever 140, also mounted on the steering column, is provided with positions corresponding to reverse, neutral, first, second and third gear ratios. Movement of the shift lever 140 moves a contact member 141 connected to a source of power 46 so that current is simultaneously supplied selectively to the contacts N, L, S, H and R (neutral, low, second, high and reverse) in pairs.

In neutral position, contact 141 supplies power to contacts N, one of which may supply power to relay 166 on closure of switch 110, and also to relay contact E61.

In first, or low speed position, contact 141 supplies power to contacts L one of which is connected to relay contact A61, while the other supplies current to the contact L & S of centrifugal switch 162. If the clutch 80 is properly moved while engaging, switch 86 remains closed, and with the accelerator depressed to give a particular range of speed of motor 88, the contacts of switch 162 remain closed. Otherwise, switch 86 or 162 is open thereby interrupting the power to contact 165 and deenergizing relay 166 to stall motor 88.

Centrifugal switches 161 and 162 are actuated by centrifugal control members 163 and 164 respectively so adjusted that the switches are selectively closed only over appropriate speed ranges of shaft 122 from motor 88 under control of the clutch pedal 80 and the accelerator 100.

In second speed position, contact 141 supplies current to the pair of contacts S one of which is connected to relay contact B61 while the other is connected to contact L & S of centrifugal switch 162, and improper coordinated operation of the clutch 80 and accelerator 100 will result in a motor stall.

In high speed position, contact 141 supplies current to the pair of contacts H one of which is connected to contact H61, while the other is connected to contact H of switch 162, so that improper operation stalls the motor 88.

In reverse, contact 141 supplies current to the pair of contacts R one of which is connected to contact D61 while the other is connected to contact R of switch 161. This centrifugal switch 161 is set so that contact R is open unless the centrifugal control 163 indicates a dead stop of shaft 122.

A parking brake 170 causes a normally open switch 171 to be closed when the brake is set, thereby supplying current to relay contact G60.

Horn button 71 is normally open and when closed supplies current to relay contact J60.

In the embodiment shown, and connected as shown, relay contacts F62, F63, G62 and G63 are dead and not used, but might be connected to other control members if that were desired.

Actuation of the rotary stepping switch 50 by impulses applied to the solenoid 48, or by manually pushing on button 49 causes the relays A—J to be selectively actuated for closure of the several controls of each of the relays. The opaque portions 22 are preferably so spaced on the film 20, that the rotary contact member 52 rests on the even contacts of switch 50 for only a short period, for instance 2.0 to 10.0 seconds, the period being determined by the spacing of the portion 22. Thus, in starting, a suitable stimulus presented by the film 20, such as verbal instructions, call for starting and shifting into low gear. As the film 20 is projected, an opaque spot 22 advances contact 51 to the second contact, thereby energizing the relay A. The subject must then push the starting switch 110 with the clutch pedal 80 depressed or with the gear shift lever 140 in neutral, which energizes solenoid 601 (or 602, etc.); must then shift lever 140 to first speed to energize solenoid 611; then engage the clutch properly by actuation of clutch pedal 80, and open the throttle by pedal 100 thereby energizing solenoids 621 and 631 respectively. If these operations are not all properly completed within a given period, such as 5 or 10 seconds, another spot 22 actuates switch 50 to move rotary contact 52 away from the second contact and onto the third contact which deenergizes the relay A and causes the record sheet 66 to be fed to test No. 2.

The contacts of relay B similarly cause actuation of recording solenoids 601, 611, 621 and 631 from driver unit No. 1 as the film calls for shifting into second speed provided the operations are performed during the period when relay B is energized.

Relay C similarly records shifting into third or high gear ratio, relay D into reverse, relay E shifting into neutral.

Relay F for the directional signal operation may be used in connection with verbal stimuli, or without verbal instruction. For instance, the motion picture may depict the approach to a one-way street which requires a right or left turn, and relay F may be energized several seconds before steering is finally required and as soon as it becomes apparent from the projected scene that a turn will be necessary, and may be deenergized just before the turn is necessary so that the subject is scored for correct operation only if the switch 130 is moved in the proper period.

Relay G is similarly energized and when energized will record operation of the parking brake 170, while relay R records steering through contacts H61, H62 and H63 and correct slippery weather brake operation through contact H60.

Relay J records horn and brake operation. Closure of switch 71 causes an impulse to be transmitted to solenoid 601 through contact J60, while solenoids 611, 621 and 631, energized through contacts J61, J62 and J63 record the operations of brake with maximum force, with normal force and no brake operation, respectively.

Of course, operations by the individual at driver unit No. 2 will cause actuation of recording solenoids 602, 612, 622 and 632, and, at unit No. 6, of solenoids 606, 616, 626 and 636.

The several driver units are connected to the central control and recording unit 14 by means of multiple conductor cables 200 which include the various individual conductors as shown between the units in Figures 3 and 4, while the wiring shown in Figure 4 preferably forms a part of each driver unit.

When used without motion picture film, the desired stimuli may be presented orally or by the slide projector 12 and the paper or record sheet 66 may be fed manually, while the relays A—J called for may be selectively actuated by switches *a—j* and the period for operation of the appropriate controls may then be determined at the will of the instructor. In such manual control, the switch 54 is moved to its other position than as shown.

For operation in sequence as determined by the film, the order may be changed by varying the connection of the switch 50 to the relays A—J. As an extreme example, all of the even contacts of switch 50 might be connected to relay A for intensive drill in correct starting.

The present invention thus provides a relatively simple mechanism for the correct and accurate training of students in the manipulation of the various control members, recording whether or not these members are correctly operated, whether or not they are operated within given periods of time, and in proper sequence and in response to appropriate stimuli. By the apparatus a large number of students may be simultaneously taught and drilled, their individual progress noted and their level of skill gradually advanced until the required proficiency is obtained.

The invention in its broader aspects is not limited to the specific mechanisms shown and described but departures may be made therefrom within the scope of the accompanying claims without departing from the principles of the invention and without sacrificing its chief advantages.

This is a continuation-in-part of my co-pending application Serial No. 267,354 filed January 21, 1952, now abandoned.

What is claimed is:

1. Apparatus for training persons in the operation of controls including in combination a central control and recording unit having a projector for projecting a sequence of stimuli to a group of persons to be trained and recording means, a plurality of individual positions each having a plurality of control members to be actuated selectively by the persons being trained in response to the stimuli, said recording means including means for separately recording the control operations of each of the persons, and means actuated in timed relation with the stimuli for selectively connecting different groups of the several control members at each position with the recording means for a limited period whereby the recording means records the selective operation of the controls within the selected group by each person within the limited period.

2. Apparatus according to claim 1 in which separate recording means are provided for each position, and each separate recording means includes means for recording the operation of several control members.

3. Apparatus for training subjects including in combination a central projector and recording unit, a plurality of individual positions each provided with a plurality of control members to be actuated by the subject in response to stimuli presented by the central unit on a screen between which and the central unit the positions are located, individual recording means in the central unit for each subject, means actuated from the projector of the central unit for conditioning the several recording means for actuation thereof selectively by first one group and then another group of the control members selectively and for a limited period after presentation of a stimulus by the projector.

4. Apparatus according to claim 3 in which a plurality of recording means are provided for each position, and said conditioning means selectively connect the recording means to various of the control members at each position.

5. Apparatus according to claim 3 in which the projector is a motion picture projector and said conditioning means are actuated from the film as it passes through the projector.

6. Apparatus according to claim 5 in which separate manually actuated means are also provided for selectively actuating the conditioning means independently of the motion picture film.

7. Apparatus according to claim 3 in which the recording means comprises a plurality of rows each having a plurality of recorders, each row serving one position, and the recorders of one row being actuated by a different control member.

8. Apparatus according to claim 7 in which switching means are provided for simultaneously, selectively connecting the recorders of each row first to one group of control members and then to a different group of control members.

9. In an apparatus for the training of a number of subjects, the combination of a motion picture projector, a plurality of groups of electromagnetic recorders, each group to be selectively actuated by the several subjects, the recorders of each group to be selectively actuated by a particular subject, and means for controlling the actuation of said recorders including a rotary stepping switch, a plurality of selective circuits to be controlled by the rotary stepping switch in its several positions and to actuate said recorders, and means for stepping the switch in timed relation to the passage of film through the projector.

10. Apparatus according to claim 9 in which a plurality of manually operable switches are provided in parallel with the stepping switch whereby the selective circuits may be controlled independently of the passage of film.

11. In apparatus for the training of drivers, an individual driver position comprising the combination of a seat, a plurality of control members to be selectively actuated by the driver in response to varying stimuli, a plurality of gang relays to be connected for selective operation, the several contacts of the gang relays being electrically connected to different ones of the members, whereby each gang relay may provide connections to a different combination of control members.

12. In apparatus for training, an individual position comprising the combination of a plurality of control members to be selectively actuated by the subject in response to varying stimuli, a plurality of gang relays to be connected for selective operation, each of said control members including a switch to be connected to a source of power, the several contacts of the gang relays being individually connected to the several switches of the control members, and means by which the gang relays and power connection may be connected to another unit, whereby each gang relay may effectively connect various combinations of the control member switches to said other unit.

13. In a training apparatus, the combination of an electric motor, a resistance for controlling the motor speed, means for optionally driving a shaft from the motor, a centrifugal switch actuated from the shaft, a lever having a plurality of positions, switch means controlled by a member controlling said optional means, and a switch controlled by said lever, said motor being controlled in its continued running by the three switches.

14. In an apparatus for the training of drivers, the combination of a pedal simulating a clutch pedal, a switch closed by depressing the clutch pedal, a switch closed by the clutch pedal when not depressed and a third switch normally closed and in series with the first switch and moving with the clutch pedal and means for opening said third switch when the clutch pedal is too rapidly moved from disengaged to engaged position.

15. In an apparatus for the training of drivers, the combination of a pedal simulating a brake pedal, a switch closed by full depression of the pedal, a second switch closed by an intermediate movement of the pedal, a relay, a source of power connected to said relay through said second switch and a capacitance, and a high resistance leak across the relay where the relay is actuated only by repeated rapid actuation of the pedal.

16. In a training apparatus the combination of means for presenting a series of stimuli, a set of controls to be selectively actuated by a subject in response to the stimuli, a plurality of gang relays, each relay being connected to a different combination of said controls and a plurality of recorders connected to said gang relays whereby the recorders are each operated by various controls dependent on the gang relay then connecting the recorders to the controls.

17. In a driver training apparatus, the combination of an electric motor, a manually variable resistor controlling the motor, a holding circuit through which power is supplied to the motor, a plurality of control members to be actuated by the driver and including means to vary said resistor, a plurality of switches operated by others of the control members and adapted to be included in said holding circuit, means for selecting which of said switches are to be included in said holding circuit whereby the holding circuit may be broken on actuation of varying ones of said switches, and recording means for selectively recording the actuation of said control members.

18. A driver training apparatus, the combination of a plurality of units each comprising an electric motor, a manually variable resistor controlling the motor, a holding circuit through which power is supplied to the motor, a plurality of control members to be actuated by the driver and including means to vary said resistor, a plurality of switches operated by others of the control members and adapted to be included in said holding circuit, means for selecting which of said switches are to be included in said holding circuit whereby the holding circuit may be broken on actuation of varying ones of said switches, and a single recording unit including means for selectively and separately recording the actuation of selected groups of said control members on each of said units.

19. In driver training apparatus, a plurality of controls to be actuated by the person to be trained, means for presenting a series of stimuli to said person requiring successive operation of certain groups of said controls, means for recording actuation of each group of said controls and means controlled by said presenting means for successively coupling said group of controls to be operated with said recording means.

20. In driver training apparatus according to claim 19 wherein said controlled means comprises a switch for connecting predetermined groups of controls to said recorder and signal generating means on said presenting means for selectively actuating said switch.

21. Apparatus for training drivers comprising a plurality of controls simulating the controls of a vehicle, a moving film projector for presenting a sequence of realistic stimuli to the person being trained and requiring actuation of predetermined groups of said controls, a recorder, switch means for successively connecting different groups of controls with said recorder to register actuation thereof in response to successive stimuli, a photocell and light source connected with said switch means and means on said film for modifying the light on said photocell to selectively actuate said switch means.

22. Apparatus for training drivers comprising a plurality of controls simulating the controls of a vehicle, a recorder, electric signal producing means associated with each control and adapted to actuate said recorder, a moving film projector for presenting a sequence of realistic stimuli each requiring the operation of certain combinations of said controls, a plurality of switch means for connecting predetermined combinations of controls to said recorder, electrically actuated means for selectively and successively operating at least certain of said switch means and signal generating means controlled by said moving film and connected with said electrically actuated means whereby said switch means are individually operated to connect predetermined combinations of controls to said recorder in synchronism with the presentation of successive stimuli requiring operation of such controls.

23. Apparatus according to claim 22 wherein said recorder includes a recording medium and feed therefor to record operation of said controls and said electrically actuated means includes connections with said feed to advance the medium between the presentation of successive stimuli.

24. In driver training apparatus, an electric drive motor, a shaft adapted to be driven thereby, a clutch including switch means for effecting engagement and disengagement of said motor and shaft, means including a supply of energy and a relay for energizing said motor, said relay having a pair of self locking contacts to electrically hold said relay in the closed position, a normally open and a normally closed centrifugal switch operated by said shaft, normally closed switch means on said clutch, a gear shift lever having a neutral, reverse and at least one forward speed and an electrical switch associated with each position and connections between said gear shift switches, said centrifugal switches, the last said clutch switch and said self locking contacts to deenergize the relay upon failure of an operator to properly coordinate the operation of said clutch and said gear shift lever.

25. In driver training apparatus, a drive motor, a relay, a source of current for energizing said relay, self locking contacts on said relay, a gear shift lever having neutral, reverse and at least one forward position and contacts associated with each position, a clutch including a switch adapted to be closed on depression of the clutch, connections between said locking contacts and a parallel circuit including the neutral contacts and said clutch switch contacts a normally open centrifugal switch operated by said motor and connected in series with said clutch switch, said forward position contact and said locking contacts and a normally closed centrifugal switch connected in series with said reverse contacts, said clutch switch and said locking contacts, whereby improper coordination of the clutch and shift lever will prevent starting and continued operation of the motor.

26. In an apparatus for the training of a number of automobile drivers, the combination of a plurality of individual driver positions each provided with a plurality of control members to be actuated by the person in that position, means for presenting a changing scene to the drivers, groups of recording means, one for each individual driver, and means for successively connecting said groups to different control members to produce simultaneously a plurality of records for each driver when so connected, whereby individual records of each driver's actuation of certain of his controls are made.

27. Apparatus as claimed in claim 26 in which said groups of recording means are included in a central recording unit.

28. In an apparatus for the training of a number of subjects, the combination of a motion picture projector, a plurality of sets of controls, one set for each subject, a plurality of groups of electromagnetic recorders, one for each subject, the number of controls in each set exceeding the number of recorders in each group, means actuated in relation to passage of film through the projector and including selective circuits for variously connecting the recorders of each group with the controls of each set whereby the recorders are actuated by different controls at different times, all of the groups of recorders being similarly connected to all of the sets of controls at any particular time.

29. Apparatus as claimed in claim 28 in which manually actuated switching means are also provided for varying the recorder-control connection.

30. In driver training apparatus, a plurality of simulated automobile units for simultaneously training a plurality of persons, a plurality of driving controls at each unit for actuation by the person to be trained thereat, means for presenting a series of stimuli simultaneously to said persons requiring successive operation of certain groups of said controls, means for recording the actuation by each person of each group of said controls, and means controlled by said presenting means for successively coupling said groups of controls at each unit to be operated with said recording means.

31. In driver training apparatus according to claim 30, wherein the means for presenting stimuli includes motion picture projecting devices and the means for successively coupling said groups of controls includes electrical circuit selecting means sequentially responsive to projection of a film by said devices.

References Cited in the file of this patent

UNITED STATES PATENTS

| | | |
|---|---|---|
| 1,961,416 | De Luca | June 5, 1934 |
| 2,088,264 | Heinis | July 27, 1937 |
| 2,260,432 | Brown | Oct. 28, 1941 |
| 2,269,444 | Durham et al. | Jan. 13, 1942 |
| 2,273,091 | De Silva | Feb. 17, 1942 |
| 2,333,772 | Eaton | Nov. 9, 1943 |
| 2,341,312 | Chedister | Feb. 8, 1944 |
| 2,373,313 | Jeandron | Apr. 10, 1945 |
| 2,392,781 | Simjian | Jan. 8, 1946 |
| 2,396,857 | Kittredge | Mar. 19, 1946 |
| 2,406,574 | Waller et al. | Aug. 27, 1946 |
| 2,533,068 | Thiele | Dec. 5, 1950 |
| 2,575,362 | Robinette | Nov. 20, 1951 |
| 2,639,101 | Hair | May 19, 1953 |
| 2,659,164 | Durham | Nov. 17, 1953 |
| 2,700,227 | Arkell et al. | Jan. 25, 1955 |